Feb. 26, 1924. 1,484,813
C. W. DAKE
TURBOGENERATOR
Filed Aug. 9, 1920 2 Sheets-Sheet 1

Witness
Edward T. Wray.

Inventor
Charles W. Dake
by Parker & Carter
Attorneys

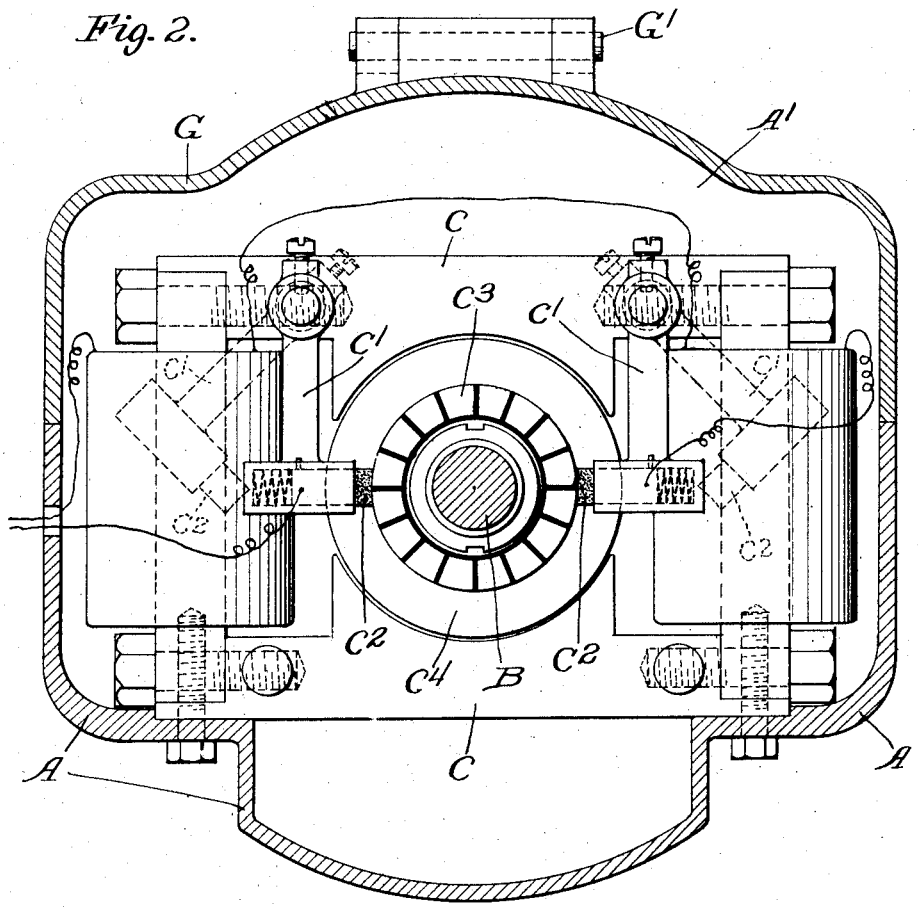

Patented Feb. 26, 1924.

1,484,813

UNITED STATES PATENT OFFICE.

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY.

TURBOGENERATOR.

Application filed August 9, 1920. Serial No. 402,252.

*To all whom it may concern:*

Be it known that I, CHARLES W. DAKE, a citizen of the United States, residing at Chicago, in the county of Cook and State of Illinois, have invented a certain new and useful Improvement in Turbogenerators, of which the following is a specification.

My invention relates to a turbo generator and has for its object especially to provide means whereby the several parts may be most easily inspected, adjusted and repaired, and whereby they may be dismounted with the least possible disturbance of the fixed portions and the relations between the several parts.

I have in mind particularly turbo generators of a relatively small type which may be used for example in railroad operation and where they are exposed to severe use and find themselves for repairs or adjustments in various widely separated shops where frequently they are manipulated by persons who have a minimum of knowledge of the particular mechanism. When the turbo generators are so dismounted or disassembled the adjustments are very likely to be disturbed in such manner that when reassembled they no longer work as they should. My invention minimizes these dangers, and for this purpose my invention has been made. I shall therefore only briefly refer and in general terms, to the several details.

My invention is illustrated in the accompanying drawings wherein:

Fig. 2 is a cross section on the line 2—2 of Fig. 1.

Like parts are indicated by like letters in all the figures.

Figure 1:
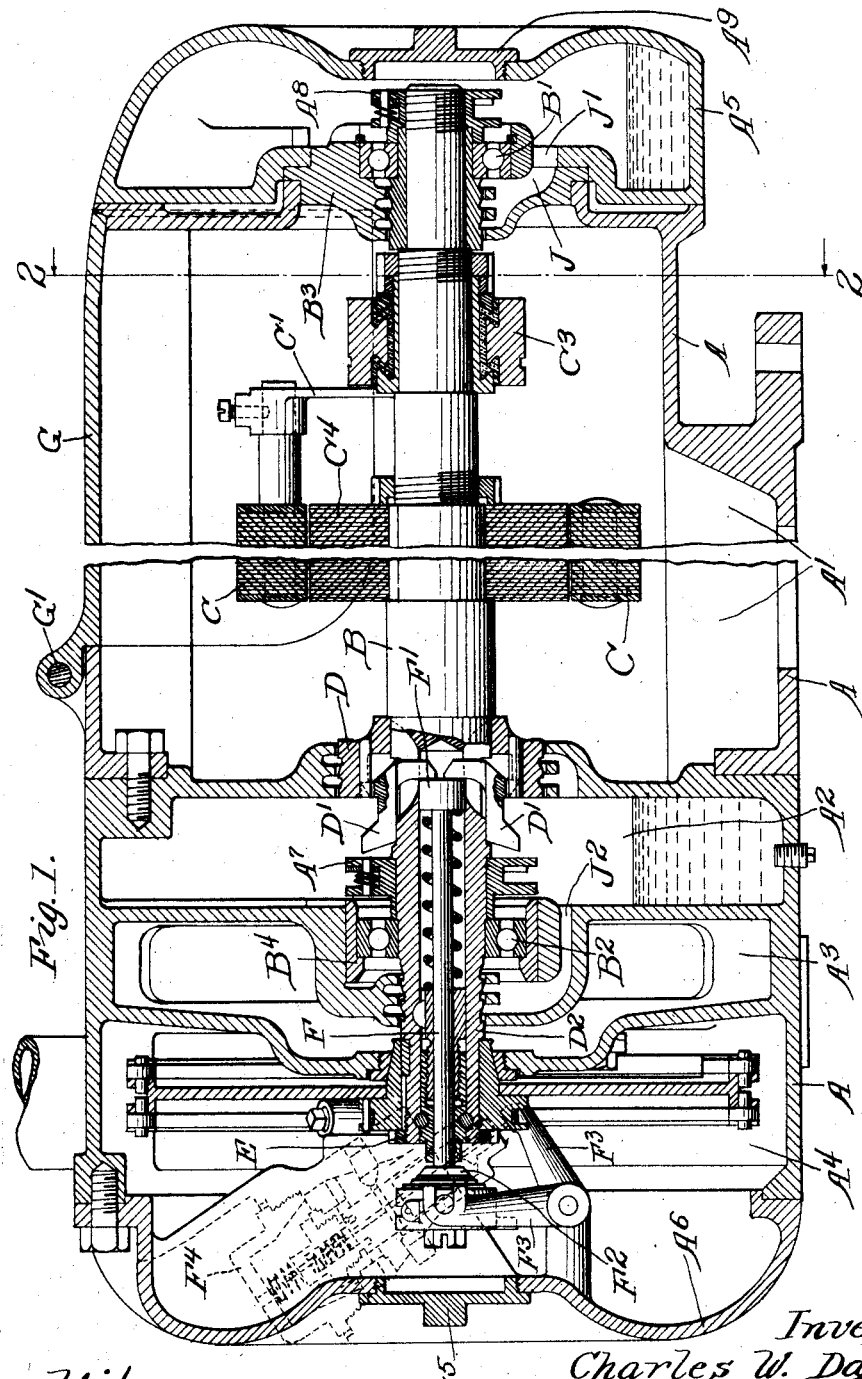
Fig. 1 is a longitudinal section of a complete turbo generator.

A is a main casing consisting it may be of two or more parts securely attached to each other and containing the generator chamber $A'$, the oiling chamber $A^2$, the ventilating chamber $A^3$ and the steam chamber $A^4$. These parts are all secured together and set up or permanently located in position in any desired manner. In addition to these parts there is the removable oil chamber casing $A^5$ at one end and the removable cover $A^6$ of the steam chamber at the other end. There is one common shaft B which runs through or extends into all of these chambers and casings. It is mounted at one end in the bearing $B'$ and near the other in the bearing $B^2$. These two bearings are mounted, the first in the ring-like part $B^3$ and the second in the ring-like part $B^4$. The part $B^3$ is mounted on the shaft and removably fitted into or associated with an aperture in the right hand end of the casing of the chamber $A'$ and held there by the walls of the oil chamber $A^5$, and the part $B^4$ is mounted in a recess in the left hand wall of the oil chamber $A^2$. In the oil chamber $A^2$ is mounted the oiling device $A^7$ on the shaft B, and in the casing of the oil chamber $A^5$ is mounted the oiling device $A^8$. In the end of this latter casing is an aperture covered by the cap $A^9$.

Mounted within the chamber $A'$ and secured to the lower part thereof are the field magnets C C, the upper having mounted thereon brush arms $C'$ $C'$ with brushes $C^2$ $C^2$ carried by said arms. These brushes are adapted when in operative position to engage the commutator $C^3$ which is mounted on the shaft, and $C^4$ is the armature also mounted on the shaft. The aperture in the outer wall of the casing A which is filled by the ring-like portion $B^3$, is of a slightly greater diameter than the armature. In the right hand wall of the casing by the oil chamber $A^2$ is an aperture filled by the ring-like part D which is mounted on the shaft B and which is associated with the governor weights $D'$ $D'$ which are mounted in slots in the hollow shaft portion $D^2$. This aperture, which is filled by the ring D is of slightly larger diameter than the oiling device $A^7$. E is a ring screw threaded on the outer end of the hollow shaft and adapted to hold the rotor in position on the shaft. The governor rod F which lies in the hollow shaft portion has at one end the enlargement $F'$ against which the governor weights press, and at the other the enlargement $F^2$ from which movement is communicated through connecting devices $F^3$ to the valve stem of the valve $F^4$. This valve and these communicating parts are preferably mounted on the casing portion $A^6$ which also has a central aperture and cap therefor $F^5$. On the top of the casing A or that portion of it which forms the chamber $A'$ is mounted the cover G by means of a pivot pin or hinge $G'$. This cover can be thrown back on the hinge to expose the interior of the chamber $A'$.

By this arrangement of parts I secure a completely closed and self-contained turbo generator whose several chambers are properly disposed and separated and whose parts are mounted so that they can all be easily inspected without removal, and so that when necessary the mere longitudinal movement of the shaft and all of the rotating parts, and parts therefor especially likely to get out of order, can be removed without being disassembled or disturbed. These parts can then be inspected, repaired and changed so far as may be necessary, and if only they are restored to proper position on the shaft the whole can be reassembled with the certainty that the several parts will come into operative position.

To dismount the turbo generator it is necessary first to remove the left end cover plate $A^6$ which carries with it the valve and the connecting mechanism so that any and all of these parts can be easily dealt with.

The ring E is then unscrewed, the lid G is lifted and the brushes swung back into the position shown in dotted lines in Fig. 2. The oil chamber casing $A^5$ is then removed. All the rotating parts are now still in proper operative relation to each other. It is now only necessary to move the shaft to the right, whereupon all such movable parts will go with the shaft and the operation of dismounting be completed. The hollow portion of the shaft when it moves to the right will carry with it the oiling device, the governor weights and governor appliances. It will also carry with it the governor weights and the ring with which they are associated, and all these parts will pass toward the right through the aperture in the right hand wall of the oil chamber $A^2$. The armature, commutator and ring $B^3$ will also freely move toward the right and all the parts including the armature can be moved through the aperture left open by the motion of the ring $B^3$.

J is a passage in the ring $B^3$ which registers with the passage $J'$ in the side of the oil chamber $A^5$ so as to form a passageway for the oil from the bearing $B^2$ into the oil chamber and oil well. The ring $B^3$ is mounted on the shaft in connection with the bearing $B^2$ and is held in position between the end wall of the chamber $A'$ and the side wall of the oil chamber $A^5$. $J^2$ is an oil passageway leading from the bearing $B^2$ into the oil chamber and oil well.

I claim:

1. In a turbo generator assembly, a multi-chambered casing, the chambers thereof being separated by apertured walls, a shaft mounted in said casing and adapted to pass through the apertures of said walls, a plurality of rotating and non-rotating parts mounted on said shaft, the apertures of said walls being adapted by their size to permit the axial removal of said shaft and parts as a unit through the end of said casing.

2. In a turbo-generator assembly, the combination with a multi chamber casing of a shaft having rotating and non-rotating parts mounted thereon, said shaft and parts being axially removable as a unit through the end of said casing, apertured partitions between said chambers, the non-rotating parts adapted to close said apertures.

3. In a turbo generator the combination of a casing having a series of centrally apertured, transverse walls which divide it into a series of separate chambers for the several parts in combination with a shaft on which are mounted aperture closures and rotating operative parts, non-rotating parts mounted in said casing, and means for moving them out of alignment with the closures, and rotating parts to permit the shaft and said closures and rotating parts to be simultaneously and axially removed as a unit from said casing.

4. In a turbo generator assembly, the combination with a multi chamber casing of a shaft having rotating and non-rotating parts mounted thereon, partitions within said casing, the non-rotating parts adapted to close said partitions, said shaft and said rotating and non-rotating parts being axially removable as a unit through the end of said casing.

5. A turbo generator comprising a casing having a series of transverse centrally apertured walls, and end pieces which divide it into a series of chambers in combination with a shaft which carries the closures for said apertures and lies between the two end pieces, a governor, a valve and connecting parts from its stem to the governor mounted on one of the end pieces, the shaft and the members mounted thereon being axially removable through said apertured walls.

6. A turbo generator comprising a closed casing having a series of transverse centrally apertured walls, and end pieces which divide it into a series of chambers in combination with a shaft which carries the closures for said apertures and lies between the two end pieces, an oiling device, a governor, an armature and a commutator mounted on the shaft, the shaft and the members mounted thereon being axially removable through said apertured walls.

7. A turbo generator comprising a closed casing having a series of transverse centrally apertured walls, and end pieces which divide it into a series of chambers in combination with a shaft which carries the closures for said apertures and lies between the two end pieces, an oiling device, a governor, an armature and a commutator mounted on the shaft, the several apertures and their respective closures being of such diameter as to permit all the parts mounted on the shaft to move through them in the direction of longitudinal movement of the shaft.

8. In a turbo generator the combination of a casing having a series of centrally apertured, transverse walls which divide it into a series of separate chambers for the several parts in combination with a shaft on which are mounted aperture closures and rotating operative parts, non-rotating parts mounted in said casing, and means for swinging them out of alignment with the closure and rotating parts to permit the shaft and said closures and rotating parts to be simultaneously and axially removed as a unit from said casing.

9. In a turbo generator the combination of a casing having a series of centrally apertured, transverse walls which divide it into a series of separate chambers for the several parts, in combination with a shaft on which are mounted aperture closures and a rotor, brushes mounted within said casing and adapted to cooperate with said rotor and to be normally in line with said rotor and said closures, and means for swinging said brushes out of line with said rotor and closures to permit the shaft and rotor and closures to be axially and simultaneously removed as a unit from the casing.

10. A turbo generator comprising a casing, a shaft mounted therein, a separate and removable oil container adapted to be mounted upon the outer projecting end of said shaft, the adjacent walls of the casing and oil container being apertured in line, a closing for the casing aperture adapted to be placed upon the shaft end and to be held in position thereupon by the oil container, oil passages leading from said oil container through said closures and a shaft bearing in said closure adapted to be supplied with oil by said passages.

Signed at Chicago, county of Cook and State of Illinois, this 29th day of July, 1920.

CHARLES W. DAKE.